United States Patent [19]

Juszak et al.

[11] E Re. 30,114

[45] Reissued Oct. 16, 1979

[54] CONTINUOUS FORMS ASSEMBLY

[75] Inventors: Joseph J. Juszak, Crystal Lake; Howard K. Absler, Skokie, both of Ill.

[73] Assignee: Uarco Incorporated, Barrington, Ill.

[21] Appl. No.: 718,389

[22] Filed: Aug. 27, 1976

Related U.S. Patent Documents

Reissue of:

[64] Patent No.: 3,905,545
Issued: Sep. 16, 1975
Appl. No.: 450,147
Filed: Mar. 11, 1974

[51] Int. Cl.[2] ..... B65D 27/10

[52] U.S. Cl. ..... 206/610; 229/69; 229/73

[58] Field of Search ..... 229/69, 73, 85; 206/610, 611

[56] References Cited

U.S. PATENT DOCUMENTS

| | | | |
|---|---|---|---|
| 3,104,799 | 9/1963 | Steidinger | 229/69 |
| 3,419,286 | 12/1968 | Noonan et al. | 229/69 |

*Primary Examiner*—Stephen P. Garbe
*Attorney, Agent, or Firm*—Wegner, Stellman, McCord, Wiles & Wood

[57] ABSTRACT

A continuous form envelope assembly, wherein a plurality of superimposed plies define mailing envelopes with inserts, including return envelopes therein. Transverse lines of weakening across the plies define the individual envelopes. The return envelope, which is an insert, is defined by two plies, one of which includes a flap formation whereby the return envelope may be closed. The other ply defining the return envelope, includes a protective portion adjacent the flap and which is secured to the outer envelope so that when the return envelope is extracted from the outer envelope, the protective portion remains with the outer envelope.

9 Claims, 3 Drawing Figures

CONTINUOUS FORMS ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to continuous business-form assemblies, and more particularly to continuous form envelope assemblies formed of superimposed plies and having insert material including at least one return envelope therein.

Representative prior art includes Steidinger U.S. Pat. No. 3,104,799; then Van Malderghem U.S. Pat. No. 3,554,438 and MacDougall, U.S. Pat. No. 3,652,007.

Recent years have seen a substantial upsurge in the use of business forms of the type that can be placed in the mail with information placed thereon by computer-operated printers or manually-operated tabulators. This upsurge is principally due to the invention disclosed in the above-identified Steidinger patent wherein a totally sealed envelope having insert material already therein can have information inscribed on the envelope and can be placed in the mail without the usual need for stuffing. The elimination of stuffing operations also eliminates the need for correlating insert material with the envelope so that the proper envelope bearing the proper insert material is directed to the correct recipient.

Moreover, as disclosed by Steidinger, the insert material may include a return envelope so that all or part of the insert material may be returned to the sender of the original envelope in the enclosed return envelope.

Naturally, such advantages have strongly commended the use of structures made according to the teaching of Steidinger. A variety of structures have evolved which include return envelopes. Frequently, the return envelope is made using a pressure sensitive transfer adhesive as the flap sealing adhesive. This adhesive strip is protected by a removable backing which must be removed by the recipient prior to sealing the return envelope. In other instances, the ply forming the side of the return envelope other than that bearing the flap is provided with a removable chip which overlies the adhesive for ease of manufacture and which may provide a measure of protection for the adhesive. In this case, rather than removing a piece of tape to expose the adhesive, the chip must be removed so as to enable the flap to be moistened and folded over for sealing of the return envelope.

Heretofore, such means have generally been desirable principally in terms simplifying the manufacture of the form and, to a lesser extent, in precluding the adhesive on the flap of the return envelope from adhering, due to moisture conditions in the mail or in storage, to the interior of the original mailer, thereby precluding easy removability of the return mailer. However, the desirability of providing such means introduces an undesirability in terms of requiring the recipient to perform an otherwise unnecessary operation in terms of removing the chip or the adhesive-protecting tape. The undesirability is enhanced in the construction wherein a chip is employed in that, if directions are not strictly adhered to, the recipient may inadvertently remove the flap of the return envelope rather than the chip.

SUMMARY OF THE INVENTION

It is the principal object of the invention to provide a new and improved continuous form envelope assembly having insert material in the form of a return envelope. More specifically, it is the object of the invention to provide such an envelope wherein the adhesive on the flap of a return envelope within the mailer is protected until such time as the mailer is opened and does not require the recipient to perform a positive act to remove the protection for such adhesive.

An exemplary embodiment of the invention achieves the foregoing object in a construction including a plurality of superimposed plies defining a continuous business form envelope assembly. The outermost ones of the plies define the front and back of mailers while intermediate plies define insert material within the mailers. Transverse lines of weakening across the plies provide for separation of the assembly into individual envelopes for mailing purposes.

Two of the intermediate plies define return envelopes. One such ply includes a flap having an adhesive of the moistenable type facing the other intermediate ply. The other intermediate ply includes a chip aligned with the adhesive-bearing flap which chip is loosely attached to the remainder of the ply, the remainder defining the other side of the return envelope. The chip is secured to the outer envelope such that, upon opening the mailer to extract the return envelope, the chip remains with the outer envelope, while the return envelope is easily pulled away from the chip due to the loose connection. As a result, when the original mailer is opened, the adhesive is automatically exposed so as to eliminate the need for the removal of a tape or a chip by the user.

According to the preferred embodiment, the return envelope is a top-opening envelope and the chip is L-shaped with the base thereof secured, as by a glue line, to the outer envelope.

Other objects of the invention will become apparent from the following specification taken in conjunction with the accompanying drawings.

DESCRIPTION OF THE PREFERRED EMBODIMENT

Figure 1:
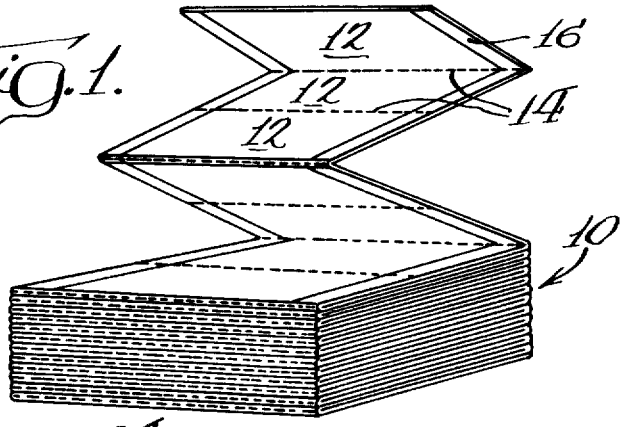
FIG. 1 is a perspective view of a continuous form envelope assembly made according to the invention.

A continuous business form envelope assembly is illustrated in FIG. 1 and is folded in a zig-zag stack, generally designated 10, as is conventional. The assembly includes a plurality of individual envelopes 12 which are defined by transverse lines of weakening 14, normally in the form of perforations, extending across the plies defining the assembly. Running longitudinally of the plies are removable control punch margins 16 as is well known.

Figure 2:
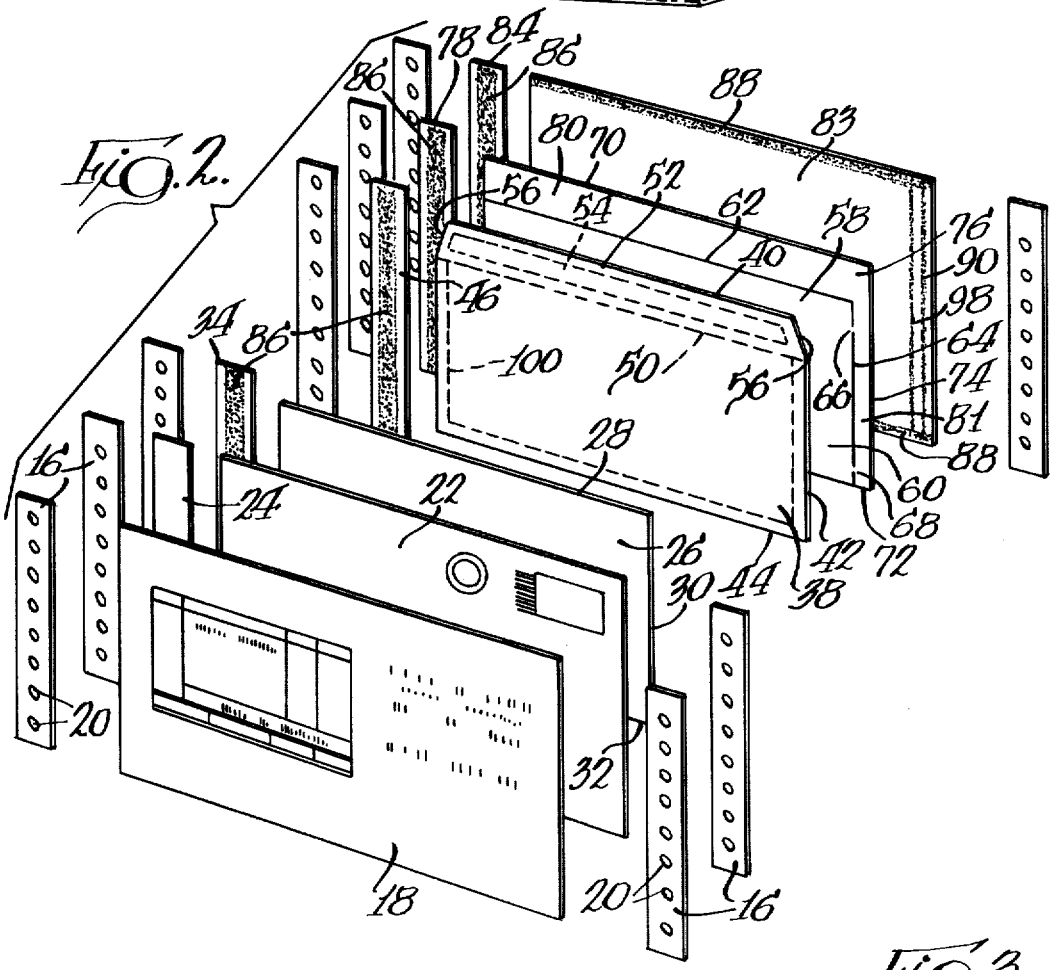
FIG. 2 is an exploded view of the various components defining an individual envelope in the assembly.
Figure 3:
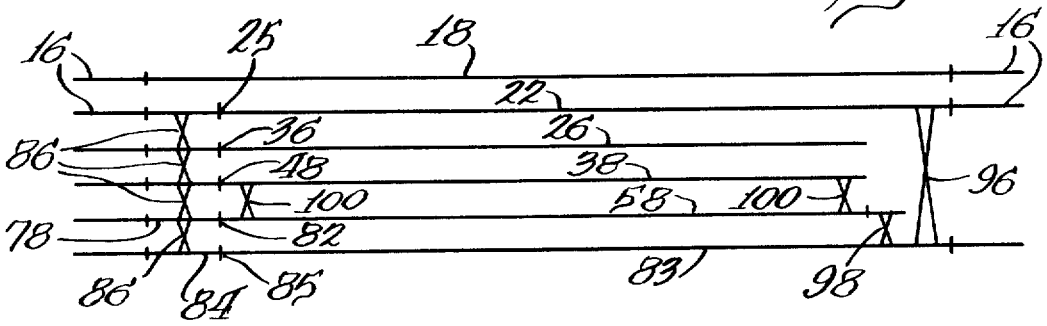
FIG. 3 is a schematic illustrating the relative dimensions of the various plies comprising an individual envelope to each other and the relationship of the glue line to the various components.

Referring now to FIGS. 2 and 3, an individual envelope 12 in the assembly will be described. It is to be understood that all of the envelopes are identical, are formed of elongated plies, and are separated by the lines of weakening 14. A first ply is designated 18 and may serve as the so-called record ply as is well known in the art. At its opposite longitudinal edges, it is provided with the control punch margins 16 having a plurality of pin-feed holes 20 therein.

The immediately subjacent ply 22 defines the front of the individual envelope or mailer in the assembly. Near one side is provided a removable stub 24 which is separable from the remainder of the ply 24 along the line of weakening 25. The stub 24 forms part of a tear strip by which access to the interior of the mailer may be achieved. Finally, the ply 22 is also provided by the control punch margins 16.

The next lowermost ply 26 is optional and may be an insert. Through the use of spot carbons or the like (not shown) on the back side of the ply 22, information may be selectively transmitted and imprinted on the insert 26. Means by which such is accomplished are well known in the art and form no part of the instant invention.

Ply 26 is die cut at margins 28, 30 and 32 so that when in the completed envelope assembly, those three margins will be free from attachment to the envelope. The fourth margin includes a stub 34 which is in line with the stub 24 and which is separable from the remainder of the insert ply 28 by a line of weakening 36. When assembled, the stub 34 serves as an attaching portion to maintain the insert 28 in a predetermined location within the envelope so as to insure proper alignment during an imprinting process. When the envelope is opened by removal of the stub as is well known, the insert 28 will be free from attachment to the inner envelope and may be easily removed.

A further ply 38 defines the front of a return envelope contained within the outer envelope. It, too, may be selectively imprinted upon through the use of spot carbon on the back side of ply 28. Like the ply 28, ply 38 includes die cuts on margins 40, 42 and 44 so that such margins are free from attachment to the interior of the mailer. The ply 38 is also provided with a stub 46 separated from the remainder of the ply 38 by a line of weakening 48. The stub 46 serves as an attaching portion for the ply 38 in the same fashion as the stub 34 serves as an attaching portion for the ply 26.

The ply 38, adjacent its upper edge, includes a line of weakening 50 which serves to define a flap 52 for the return envelope. On the back side of the flap 52 is a moistenable adhesive 54 whereby the return envelope may be sealed.

If desired, angled cuts 56 may be provided at the corners of the flap 52.

A ply 58 defines the back of the return envelope and a covering portion for the adhesive 54. Specifically, the ply 58 includes a return envelope back-defining portion 60 which is separated from the remainder of the ply 58 by transverse slit 62 that aligns approximately with the line of weakening 50 on the ply 38 and a longitudinal partial slit 64. The partial slit 64 is not continuous as at 66 and 68 so as to define small, easily rupturable or breakable tongues interconnecting the back-defining portion 60 with the remainder of the ply 58.

The upper and lower margins 70 and 72 of the ply 58 are die cut so as to free the ply 58 from attachment to the mailer along those margins. The margin 74 is also die cut but, as seen in FIG. 3, extends somewhat to the right of the margins 30 and 42 on the plies 26 and 38.

As a result, it will be seen that in addition to the return envelope back-defining portion 60, ply 58 includes a generally L-shaped chip 76. The chip 76 in turn defines a covering portion 80, defined by the upright of the L and an attaching portion 81 defined by the base of the L. As can be seen, the covering portion 80 is aligned with the adhesive 54 to cover the same.

Finally, the ply 58 includes a stub 78 separated from the remainder of the ply by a line of weakening 82, which stub 78 functions as an attaching portion for the ply 58.

A ply 83 defines the back of the mailer. It includes a stub 84 at one side thereof separated from the remainder of the ply by a line of weakening 85.

Each envelope 12 comprises the foregoing part and is secured in assembled relation as by glue lines. For example, glue lines 86 (indicated as X's in FIG. 3) secure the stubs 24, 34, 46, 78 and 84 together to define a single unitary tear-off strip. A transverse glue line 88 on the upper and lower margins of the ply 83 serves to assemble the outer envelope. Specifically, the glue lines 88 secure ply 83 to the ply 22. In addition, along one longitudinal margin, a glue line 90 is provided, which glue line also serves to secure the plies 83 and 22 to each other to define a completely sealed mailer.

A glue line 98 extends between the ply 82 and the base of the L-shaped chip 76 to secure the latter to the outer envelope.

Finally, to complete the return envelope defined by plies 38 and 58, a glue line 100 extends about three marginal edges up the ply 38 within the line of weakening 48.

From the foregoing, it will be appreciated that removal of the tear strip defined by the stubs 24, 34, 46, 78 and 84 will substantially free the contacts from the outer envelope of the mailer. In this respect, the ply 26, if present, will be completely free, while the plies 38 and 58 will be held only by the tongues 66 and 68. The tongues 66 and 68 are so weak that a gentle pull on the return envelope defined by the plies 38 and 58 will result in their severance and the free removal of the return envelope. Due to the presence of the glue line 98, the L-shaped chip 76 will remain within the outer envelope and may be discarded therewith. However, prior to such removal of the return envelope, it will be appreciated that the covering portion 80 has served to cover the adhesive 54 during storage and mailing. Thus, a continuous form envelope assembly made according to the invention eliminates any need for the recipient to remove a chip or an adhesive protective tape prior to sealing the return envelope. It therefore renders a mailer easier to use and eliminates any possibility that the flap 52 on the return envelope would be removed rather than the removable chip.

We claim:

1. In a continuous forms envelope assembly wherein a plurality of elongated, superimposed plies including transverse lines of weakening defining individual envelopes which may be separated from the assembly therealong and wherein upper and lowermost ones of the plies define fronts and backs of envelopes with intermediate plies defining insert material within each envelope including at least a return envelope, the return envelope being defined by portions of adjacent intermediate plies, respectively defining the front and back of the return envelope, one of said adjacent plies further including an envelope flap that may be folded about and secured to the other of said adjacent plies of closing the return envelope and wherein the intermediate plies are constructed so that the insert material is free from the outer envelope along at least two, opposed, marginal edges of the outer envelope, the improvement wherein said other adjacent ply has an attaching portion secured to the outer envelope, said attaching portion being attached to a covering portion which is in substantial abutment with said flap; said attaching portion and said covering portion being loosely secured to the remainder of said other adjacent ply so that upon the opening of the outer envelope, the return envelope can be easily extracted with said attaching portion and said covering portion remaining interiorly of the outer envelope.

2. A continuous forms envelope assembly according to claim 1 wherein said one adjacent ply having said flap thereon further includes a moistenable adhesive on the side of said flap facing said other adjacent ply and abutting said covering portion.

3. A continuous forms envelope assembly according to claim 2 wherein said adjacent plies defining said return envelope are configured to define a top opening envelope and wherein said attaching portion and said covering portion are defined by an L-shaped chip.

4. A continuous forms envelope assembly comprising: a plurality of at least four superimposed, elongated plies of paper, a first of said plies defining the fronts of outer envelopes; a second of said plies defining one of the fronts and the backs of return envelopes within the outer envelopes, a third of the plies defining the other of the fronts and the backs of the return envelopes within the outer envelopes, and the fourth of the plies defining the backs of the outer envelopes; said plies including transverse lines of weakening defining individual envelopes which may be separated from the assembly therealong; said first and fourth plies being secured to each other about at least three marginal edges to define a sealed outer envelope; one of said second and third plies having at least two, opposed, marginal edges free from connection to said outer envelope and a flap extending along one marginal edge to define a sealing flap for the return envelope; the other of said second and third plies having at least one marginal edge secured to said outer envelope and a covering portion extending from said marginal edge in alignment and in substantial abutment with said flap, means separating said marginal edge and said covering portion from the remainder of said other of said second and third plies; and means securing said remainder to said one of said second and third plies to define said return envelopes.

5. A continuous forms envelope assembly according to claim 1 wherein said attaching and covering portions are loosely secured to said remainder by small, easily rupturable tongues in a partial slit separating said attaching and covering portions from said remainder.

*6. A sealed envelope comprising: front and back panels, and insert material within said sealed envelope; said insert material comprising interconnected upper and lower panels forming a return envelope having an opening along one edge thereof, one of said return envelope panels being separable along a keen line of weakening provided therealong, the other of said return envelope panels having a flap foldable along a fold line provided thereon; attaching means connecting a portion of said insert material in said sealed envelope with said sealed envelope, said portion comprising a section of said one panel which is superimposed over said flap and which is separable along said keen line of weakening; and a tear strip on said sealed envelope for opening said sealed envelope and freeing said return envelope from said sealed envelope, said section of said return envelope being retained with said sealed envelope upon the freeing of said return envelope from said sealed envelope.*

*7. The envelope according to claim 6, wherein said tear strip is located along one end of said sealed envelope, and said keen line of weakening is disposed perpendicular to said tear strip.*

*8. The envelope according to claim 6, wherein said section extends along said return envelope between opposite end edges thereof.*

*9. In a continuous forms envelope assembly wherein a plurality of elongated, superimposed plies including transverse lines of weakening defining individual envelopes which may be separated from the assembly therealong and wherein upper and lowermost ones of the plies define fronts and backs of envelopes with intermediate plies defining insert material within each envelope including at least a part of a return envelope, the return envelope being defined by portions of adjacent plies including at least one intermediate ply, one of the adjacent plies including an envelope flap that may be folded about and secured to the other of the adjacent plies for closing the return envelope and wherein the intermediate plies are constructed so that the insert material is free from the outer envelope along at least two, opposed, marginal edges of the outer envelope, the improvement wherein said other adjacent ply has an attaching portion thereof secured to at least one of said upper and lowermost plies with said attaching portion including a covering portion in substantial abutment with said flap; said attaching portion and said covering portion being loosely secured to the remainder of said other adjacent ply so that upon the opening of the outer envelope, the return envelope may be easily separated therefrom with said edge portion and said covering portion remaining attached to said one of said upper and lowermost plies.*

* * * * *